US008352521B2

United States Patent
Yamashita et al.

(10) Patent No.: US 8,352,521 B2
(45) Date of Patent: Jan. 8, 2013

(54) FILE SYSTEM MANAGING METHOD AND RECORDING MEDIUM

(75) Inventors: Akiyoshi Yamashita, Ehime (JP); Katsuya Watanabe, Ehime (JP)

(73) Assignee: Panasonic Corporation, Osaka (JP)

( * ) Notice: Subject to any disclaimer, the term of this patent is extended or adjusted under 35 U.S.C. 154(b) by 99 days.

(21) Appl. No.: 13/059,196

(22) PCT Filed: Feb. 10, 2010

(86) PCT No.: PCT/JP2010/000807
§ 371 (c)(1), (2), (4) Date: Feb. 15, 2011

(87) PCT Pub. No.: WO2010/095393
PCT Pub. Date: Aug. 26, 2010

(65) Prior Publication Data
US 2011/0137965 A1    Jun. 9, 2011

(30) Foreign Application Priority Data

Feb. 20, 2009  (JP) .................................. 2009-037259
Feb. 27, 2009  (JP) .................................. 2009-044947

(51) Int. Cl.
*G06F 17/30* (2006.01)

(52) U.S. Cl. ......... 707/822; 707/610; 707/790; 707/828

(58) Field of Classification Search ........... 707/600–899
See application file for complete search history.

(56) References Cited

U.S. PATENT DOCUMENTS

| 6,072,759 A | 6/2000 | Maeda et al. |
| 2005/0174902 A1 | 8/2005 | Fujita |
| 2006/0212495 A1 * | 9/2006 | Tokunaga et al. ............. 707/204 |
| 2006/0268670 A1 | 11/2006 | Kimura et al. |
| 2007/0133954 A1 | 6/2007 | Maeda et al. |

FOREIGN PATENT DOCUMENTS

| JP | 10-021673 | 1/1998 |
| JP | 2002-279709 | 9/2002 |
| JP | 2004-145411 | 5/2004 |
| JP | 2007-012248 | 1/2007 |
| JP | 2007-193900 | 8/2007 |
| JP | 2005-222628 | 8/2008 |
| WO | 2006/070523 | 7/2006 |

OTHER PUBLICATIONS

Blu-ray Disc specification BD-RE Ver. 2.0/2.1/3.0 (Written discussion provided).
Blu-ray Disc specification BD-ROM Ver. 1.0 (Written discussion provided).
Blu-ray Disc specification BD-R Ver. 1.0 (Written discussion provided).

* cited by examiner

*Primary Examiner* — Isaac M Woo
(74) *Attorney, Agent, or Firm* — Hamre, Schumann, Mueller & Larson, P.C.

(57) ABSTRACT

In a recording medium including stacked recording layers, management data requiring reliability is recorded in the recording layer far from the surface of the recording medium and data bodies are recorded in the recording layer close to the surface of the recording medium. Thus a data file can be read even if defects such as fingerprints and scratches occur on the surface of the recording medium.

17 Claims, 9 Drawing Sheets

FIG. 8A
| Body size [byte] | CENTER VALUE [byte] | NUMBER |
|---|---|---|
| 2k~8k | 5k | 12 |
| 8k~16k | 12k | 39 |
| 16k~64k | 40k | 98 |
| 64k~128k | 96k | 197 |
| 128k~512k | 384k | 392 |
| 512k~1M | 768k | 527 |
| 1M~4M | 2.5M | 368 |
| 4M~8M | 6M | 206 |
| 8M~32M | 20M | 101 |
| 32M~64M | 48M | 42 |
| 64M~256M | 192M | 9 |
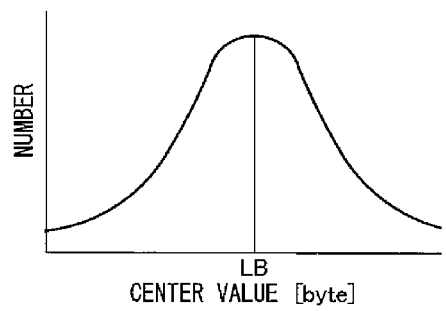
FIG. 8B
FIG. 8C
| Entry size [byte] | CENTER VALUE [byte] | NUMBER |
|---|---|---|
| 1k~3k | 2k | 192 |
| 3k~7k | 5k | 443 |
| 7k~11k | 9k | 721 |
| 11k~15k | 13k | 427 |
| 15k~19k | 17k | 147 |
| 19k~23k | 21k | 61 |
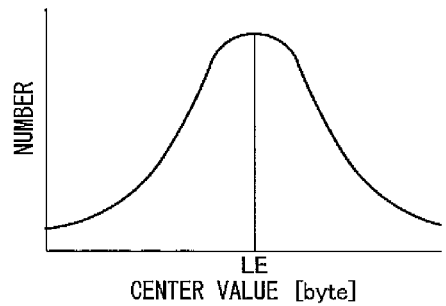
FIG. 8D
FIG. 8E
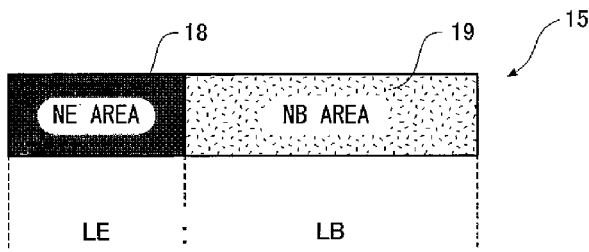

FIG. 10
PRIOR ART

| LAYER L0 | Entry 1 | Body 1 | Entry 2 | Body 2 | Entry 3 | Body 3 | ... | Entry n | Body n |

| LAYER L1 | Entry n+1 | Body n+1 | Entry n+2 | Body n+2 | Entry n+3 | Body n+3 | EMPTY | ns # FILE SYSTEM MANAGING METHOD AND RECORDING MEDIUM

REFERENCE TO RELATED APPLICATIONS

The disclosure of Japanese Patent Application No. 2008-197124 filed Jul. 31, 2008 including specification, drawings and claims is incorporated herein by reference in its entirety.

TECHNICAL FIELD

The present invention relates to a file system managing method and a recording medium using the same, in which data is recorded in the recording medium including stacked recording areas.

BACKGROUND ART

As optical discs have developed to CDs, DVDs, and Blu-rays with increasing storage capacities, the file systems have been taken over by new generations. To be specific, ISO 9660 was taken over by a file system called UDF (Universal Disk Format) that was defined by OSTA (Optical Storage Technology Association) and was standardized by ISO/TEC and Ecma International (e.g., see Non-Patent Literatures 1 and 2). After that, UDF has been revised several times. UDF 2.50 has been adopted for BD-RE (Ver. 2.0/2.1/3.0) and BD-ROM (Ver. 1.0) and UDF 2.60 has been adopted for BD-R (Ver 1.0) (e.g., see Non-Patent Literatures 3 to 5).

Generally, optical discs on which information is recorded thus are bare discs and the surfaces of the discs are likely to be contaminated or damaged during the manufacturing or use of the optical discs. In the case where defects occur and the management information of a file system is not correctly read, a recorded file cannot be reproduced. Conversely, even if a file body is defectively read, a file can be reproduced simply by correctly reading the management information. Thus in order to read a file regardless of whether the file body is defective or not, file system management areas are recorded at two points in UDF to have a dual management structure. The file system management area contains management information for managing the hierarchical structure of a file system and the recording area of a file body. With this structure, even when one of the management areas is defectively read, a file can be reproduced by reading the other management area (e.g., see Patent Literature 1).

In another known technique, in order to securely perform reproduction when an impact from an external factor causes damage or fingerprints are placed, important file system management areas are not situated on the inner and outer peripheries of a disc but on the inner and intermediate parts that are less subjected to fingerprints and scratches (e.g., see Patent Literature 2).

CITATION LIST

Patent Literatures

Patent Literature 1: Japanese Patent Laid-Open No. 2002-279709
Patent Literature 2: Japanese Patent Laid-Open No. 2007-193900

Non Patent Literatures

Non Patent Literature 1: ISO/IEC 13346
Non Patent Literature 2: ECMA-167
Non Patent Literature 3: Blu-ray Disc specification BD-RE Ver. 2.0/2.1/3.0
Non Patent Literature 4: Blu-ray Disc specification BD-ROM Ver. 1.0
Non Patent Literature 5: Blu-ray Disc specification BD-R Ver 1.0

SUMMARY OF INVENTION

Problems to be Solved by the Invention

FIG. 2 is a sectional view showing states of an optical pickup for a Blu-ray disc that has four recording layers. FIG. 10 illustrates the data structure of a double-layer disc in which data is recorded based on a file system managing method of the related art. For example, on one surface of a substrate 102 made of an acrylic resin or a polycarbonate resin, the recording layers of L0 to L3 are sequentially formed and a light transmissive layer 103 is formed on the surface of the outermost layer L3. An objective lens 201 of the optical pickup for recording and reproduction of the Blu-ray disc has an extremely large NA (Numerical Aperture) of 0.85.

The optical pickup having such a large NA causes the following problems: as shown in FIG. 2, a light beam is blocked, reflected, or diffracted by scratches or fingerprints (defects) on the surface of the Blu-ray disc, so that a sufficient quantity of light cannot reach the recording layers. Moreover, access near the surface of the disc increases the ratio of a defect relative to a diameter of a light beam spot on the surface of the disc. Thus even when management information and important data are situated on the inner and intermediate parts as in Patent Literature 2, an RF signal recorded on the disc may be lost due to the defects in the layers close to the surface of the disc. Further, a servo becomes unstable and thus files in the layers close to the surface cannot be read.

The data structure of UDF is made up of File Entries serving as management data and File Bodies serving as data bodies, and the management data and the data bodies are provided in pairs constituting a file. Typically, as shown in FIG. 10, the data is sequentially recorded in pairs from the innermost layer L0 to the layer close to the surface.

In the reproduction of these files in a UDF file system, only the File Entry serving as management data is first read and then the integrity of the data and the position of the File Body serving as a data body are confirmed. After that, the File Body serving as a data body is read. In this case, the File Bodies are data bodies including music, images, and texts. Even if the data is partially defective, the data is usable in most cases, though noise or garbled characters may occur. The data may be recovered after reading. The File Entries are management data in which all the data bits have strict meanings. When one of the data bits is defective, the corresponding File Body cannot be read.

The influence of defects increases as closer to the surface of the Blu-ray disc. Thus when the management data is written in the layer close to the surface, the management data is likely to be lost by the defects. If the management data becomes unreadable due to the defects, a pair constituting a file cannot be reproduced, so that the file body cannot be read.

A file system managing method and a recording medium according to the present invention have been devised to solve the problems. An object of the present invention is to read a data file in a recording medium such as an optical disc in which data is recorded in multiple layers, even if defects occur on a disc surface due to fingerprints or scratches on the disc surface.

Means for Solving the Problem

A file system managing method according to the present invention, when file data composed of management data and data bodies is written in a recording medium in which a recording area is formed of multiple recording layers stacked on a substrate, the method including: dividing, at any ratio, the recording area into a data body recording area and a management data recording area allocated to an area closer to the substrate than the data body recording area; writing the management data in the management data recording area; and writing the data bodies in the data body recording area.

The data body recording area may have a storage capacity equal to the storage capacity of the management data recording area.

The recording layers may be even-numbered and the boundary between the data body recording area and the management data recording area may be situated on an end of the recording layer.

The recording layers may be odd-numbered and the boundary between the data body recording area and the management data recording area may be situated on the midpoint of the recording layer.

In consideration of the spiral direction of the recording layer, the data body recording area preferably has a recording starting point upstream in the spiral direction.

In consideration of the spiral direction of the recording layer, the management data recording area is preferably allocated upstream in the spiral direction.

When the data body recording area has an insufficient writing area and the management data recording area has an empty space, the method preferably further includes: dividing the empty space into a free-space data body recording area and a free-space management data recording area allocated to an area continuing from the management data recording area, at a ratio between the data amount of the written management data and the data amount of the written data bodies.

When the data body recording area has an insufficient writing area and the management data recording area has an empty space, the method preferably further includes: determining the standard deviation of the data amounts of the written data bodies; selecting one of the data amounts of the data bodies as the reference data amount of the data bodies, the selected data amount being closest to a deviation value of 50; determining the standard deviation of the data amounts of the written management data; selecting one of the data amounts of the management data as the reference data amount of the management data, the selected data amount being closest to a deviation value of 50; and dividing the empty space into a free-space data body recording area and a free-space management data recording area allocated to an area continuing from the management data recording area, at a ratio between the reference data amount of the data bodies and the reference data amount of the management data.

The boundary between the free-space data body recording area and the management data recording area may be situated on an end of the recording layer such that the end of the recording layer is adjacent, in a writing direction, to a boundary determined according to the ratio between the data amounts.

The file data may be managed by a UDF file system, the management data may be a File Entry, and the data body may be a File Body.

The recording medium may be an optical disc.

A recording medium of the present invention is a recording medium in which file data composed of management data and data bodies is recorded and a recording area is formed of multiple recording layers stacked on a substrate, wherein the recording area is divided at any ratio into a data body recording area and a management data recording area allocated to an area closer to the substrate than the data body recording area, the management data is recorded in the management data recording area, and the data bodies are recorded in the data body recording area.

The data body recording area may have a storage capacity equal to the storage capacity of the management data recording area.

The data bodies may be recorded in the overall data body recording area and an empty space other than the recorded management data in the management data recording area may be further divided into a free-space data body recording area and a free-space management data recording area.

Thus in a recording medium such an optical disc in which data is recorded in multiple layers, a data file can be read even if defects such as fingerprints and scratches occur on a disc surface.

Advantage of the Invention

As has been discussed, in a recording medium including stacked recording layers, management data requiring reliability is recorded in a recording layer far from the surface of the recording medium and a data body is recorded in a recording layer close to the surface. Thus even if defects such as fingerprints or scratches occur on the surface of the recording medium, a data file can be read.

BRIEF DESCRIPTION OF THE DRAWINGS

FIG. 8 shows the tables and distribution charts of data distributions according to the third embodiment;

FIG. 10 illustrates the data structure of a double-layer disc in which data is recorded based on a file system managing method of the related art.

DESCRIPTION OF EMBODIMENTS

Before the explanation of embodiments of the present invention, the following will specifically describe the influence of defects such as scratches, dust, and fingerprints on a disc surface.

Figure 2:
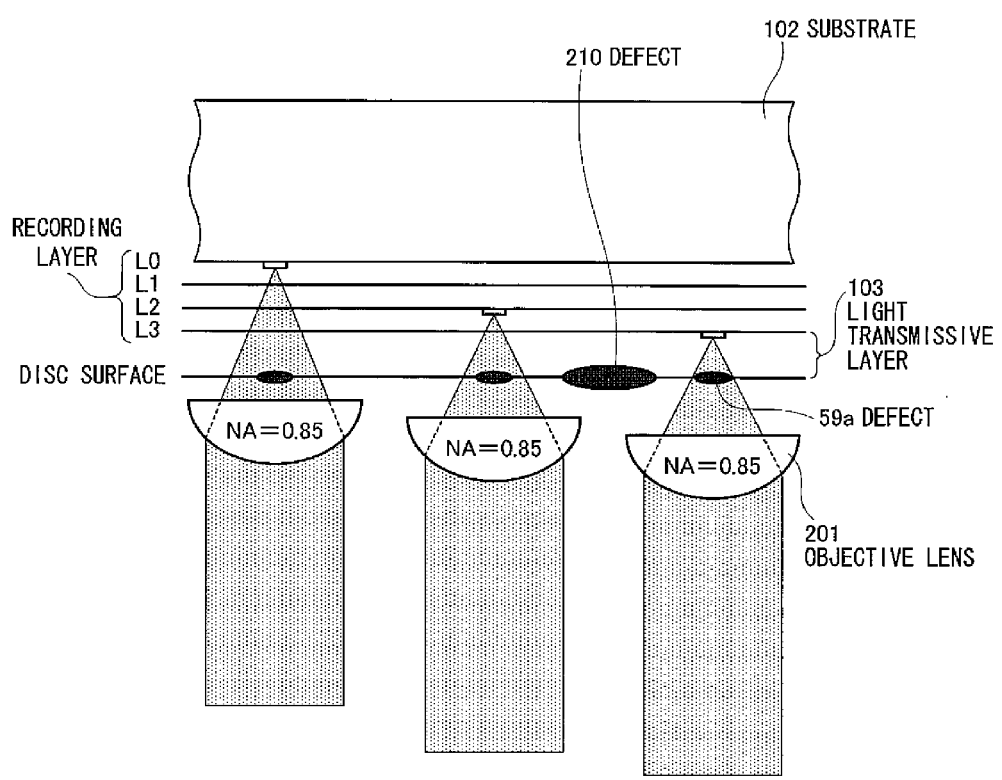
FIG. 2 shows states of an optical pickup for the Blu-ray disc.

FIG. 2 is a conceptual diagram showing the relative size of a light beam area damaged by defects when a light beam from an optical pickup is focused in layers L0, L2, and L3 of a four-layer disc.

As shown in FIG. 2, the diameter of the light beam on the surface of the optical disc varies with the depth of a recording layer in which the light beam is focused. For example, when the light beam is focused in the recording layers (layers L2 and L3) close to the surface of the optical disc, the light beam passing through the disc surface has a small cross-sectional area. When the light beam is focused in the recording layer (L0) far from the disc surface, the light beam has a large cross-sectional area. Thus when the light beam is focused in the recording layers (layers L2 and L3) close to the surface of the optical disc, a cross-sectional area blocked in the light beam by a defect 59a on the disc surface is larger than that of a light beam focused in the recording layer (L0) far from the disc surface, so that the light beam passing through the surface of the optical disc has a relatively small cross-sectional area. Therefore, the ratio of a scratch or dust to the cross-sectional area of the light beam increases on the surface of the optical disc as the light beam focused in the recording layers is closer to the surface of the optical disc, and errors are likely to occur during recording and reproduction of data.

As has been discussed, a scratch or dust on the surface of the optical disc adversely affects when the light beam is focused in the recording layers close to the surface of the optical disc. The influence decreases when the light beam is focused in the recording layer far from the surface of the optical disc.

A feature of the file system managing method according to the present invention and a recording medium in which data is recorded by the method is that a management data recording area is provided in the recording layer far from the disc surface, the recording layer being hardly affected by defects on the surface. Thus even if defects such as fingerprints and scratches occur on the surface of the recording medium, a data file can be read.

Further, a surface defect 210 larger than the cross sectional area of the light beam may be formed on the surface of the optical disc. When the light beam crosses the extremely large surface defect 210, the quantity of reflected light considerably decreases in all of the recording layers where the light beam is to be focused. Thus an error occurs during recording and reproduction of data. In the presence of such a large scratch or dust on the surface of the optical disc, the defect can be easily confirmed by a visual check and thus the optical disc can be handled as a defective item.

The following will describe embodiments of the file system managing method of the present invention and the recording medium in which file data is written by the method. Mainly the file system managing method will be discussed.

First Embodiment

An example of a first embodiment is a four-layer optical disc that is controlled by a file system managing method according to the present invention.

Figure 3:
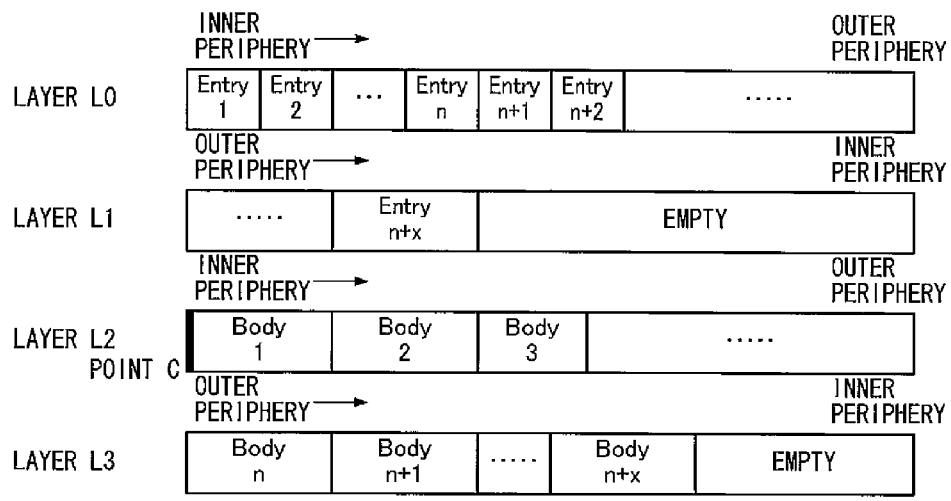
FIG. 3 illustrates the data structure of the four-layer disc in which data is recorded based on a file system managing method according to a first embodiment.

FIG. 3 illustrates the data structure of the four-layer disc in which data is recorded based on the file system managing method according to the first embodiment. FIG. 3 is a structural diagram showing the recording array of the data according to the present embodiment. File Entries are management data and thus are substantially uniformly sized. File Bodies vary in data size with the contents of data and are typically as large as or larger than the File Entries. In this case, the size of a recording area for the File Entries and the size of a recording area for the File Bodies are optionally determined according to the respective data amounts, and a boundary is determined between the recording area for the File Entries far from the surface of the optical disc and the recording area for the File Bodies close to the surface of the optical disc. In the case of a small data size, the File Entries and the File Bodies have substantially the same size. For example, in the case of a data size of about 2048 bytes, the File Entries and the File Bodies have substantially the same size. In this case, the storage capacities of the recording areas for the File Entries and the File Bodies are each equivalent to a half of the capacity of the disc. Thus the recording area for the File Entries can be located in the innermost layer.

In the example of the present embodiment, the boundary between the recording area for the File Entries far from the surface of the optical disc and the recording area for the File Bodies close to the surface of the optical disc is located at a half of the capacity of the disc.

In this case, a starting point for recording the File Bodies is set at position N/2 (point C) situated at a half of a capacity N of the disc. File Entries are sequentially recorded from the inner periphery of a layer L0 that is the innermost layer relative to the surface of the optical disc. In a double-layer disc, File Bodies are sequentially recorded from N/2 on the outermost periphery to the innermost periphery of a layer L1 after File Entries are recorded. In a four-layer disc, File Bodies are sequentially recorded from N/2 on the innermost periphery to the outmost periphery of a layer L2. After the layer L2 becomes full of the File Bodies, File Bodies are continuously recorded, in consideration of a spiral direction, in a recording layer L3 that is adjacent to the layer L2 near the surface of the optical disc. In an eight-layer disc, File Bodies are sequentially recorded from N/2 on the innermost periphery to the outermost periphery of a layer L4. After the layer L4 becomes full of the File Bodies, File Bodies are recorded in a recording layer L5 that is adjacent to the layer L4 near the surface of the optical disc.

In this optical disc, the spiral directions of the adjacent recording layers are opposite from each other. Thus in the odd-numbered layers from a substrate, recording is started from the innermost peripheries. In the even-numbered layers, recording is started from the outermost peripheries. In the case where the recording layers are all in the same spiral direction, recording is started from the innermost peripheries or the outermost peripheries of the layers. Recording is similarly performed in the following embodiments.

To be specific, as shown in FIG. 3 illustrating the four-layer disc, File Entry 1 is recorded from the innermost position of the layer L0, that is, the front end of the layer L0 and then is verified therein. After that, a light beam is moved to a part around the innermost periphery of the layer L2, that is, the front end of the layer L2 and File Body 1 corresponding to File Entry 1 is recorded therein. Next, File Entry 2 is recorded in a block next to recorded File Entry 1 and is verified therein. After that, the light beam is similarly moved to a part around the inner periphery of the layer L2, that is, the front end of the layer L2 and File Body 2 corresponding to File Entry 2 is recorded in a block next to File Body 1. When the layer L1 is full of File Bodies and has no other recording area, File Body n is recorded in the adjacent layer L3. In this way, data is recorded sequentially in the layers toward the surface of the disc. During the recording of data, multiple File Entries are consecutively recorded by using a cache memory, so that a file system can be managed according to the present embodiment without increasing the recording time of the optical disc.

The first embodiment described the four-layer disc. The first embodiment is applicable to even-numbered-layer discs including double-layer, four-layer, six-layer, sixteen-layer discs.

In the file system managing method and a recording medium in which data is recorded by the method, the optical disc made up of even-numbered layers is divided into an inner layer side and an outer layer side with respect to the surface layer of the optical disc, and management data including File Entries is written in the inner layer side and data bodies including File Bodies are written in the outer layer side. Thus even if the surface of the optical disc has defects such as scratches and dust next to the outer layer side, the defects on the surface are less likely to cause a loss of read management data, so that data recorded on the optical disc can be read.

Second Embodiment

Figure 4:
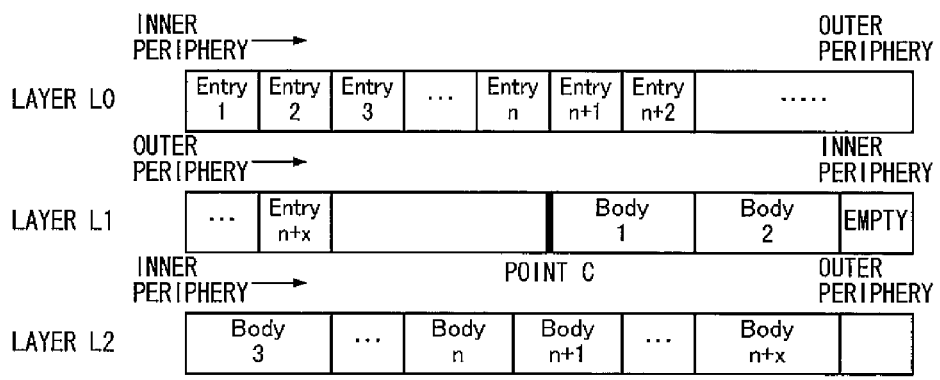
FIG. 4 illustrates the data structure of the three-layer disc in which data is recorded based on a file system managing method according to a second embodiment.

Referring to FIGS. 1 and 4, the following will describe a triple-layer optical disc controlled by a file system managing method of the present invention. The optical disc including odd-numbered recording layers is divided into a recording area for File Entries and a recording area for File Bodies according to a second embodiment.

FIG. 1 shows the spiral directions of recording tracks on double-layer, triple-layer, and four-layer Blu-ray discs handled in the present invention. FIG. 4 illustrates the data structure of the triple-layer disc in which data is recorded based on the file system managing method according to the second embodiment. FIG. 4 is also a structural diagram showing a recording state of the data according to the present embodiment. As in the first embodiment, first, the recording areas for File Entries and File Bodies are dividedly obtained.

As shown in FIG. 4, a File Body is first recorded from an intermediate layer L1 in which a radial position C is situated at a half of a capacity N of the disc. The spiral directions of the recording tracks of the layer L1 and a layer L0 are opposite from each other. Thus File Bodies are recorded from the point C at the intermediate position of the layer L1 to the innermost periphery of the layer L1 and in a recording layer L2 that is adjacent to the intermediate layer L1 near the surface of the disc, and File Entries are recorded in the layer L0 farthest from the surface of the disc and are recorded from the outermost periphery of the layer L1, which is adjacent to the layer L0, to the point C of the intermediate layer.

To be specific, for example, File Entry 1 is first recorded from the innermost position of the layer L0, that is, the front end of the layer L0 and then is verified therein. After that, a light beam is moved to the adjacent layer L1 and File Body 1 corresponding to File Entry 1 is recorded from the point C to the inner periphery of the layer L1. Next, the light beam is returned to the layer L0 and File Entry 2 is recorded in a block next to recorded File Entry 1 and then is verified therein. After that, the light beam is similarly moved to a part around the inner periphery of the layer L1, that is, the front end of the layer L1, and File Body 2 corresponding to File Entry 2 is recorded in a block next to File Body 1. When an area from the point C to the inner periphery of the layer L1 becomes full of File Bodies, File Body n is recorded in the layer L2 adjacent to the layer L1. In this way, data is recorded sequentially in the layers toward the surface of the disc. In the case where recording of File Bodies is started near the innermost periphery of the layer L1, a file system recognizes the size of the File Bodies at the completion of recording of File Entries. Thus it is decided whether or not the layer L1 has a sufficient area for recording File Body n. When the layer L1 has an insufficient area, the light beam is moved to the adjacent layer L2 and the recording of File Bodies can be started from the inner periphery of the layer L2. As in the first embodiment, during the recording of data, multiple File Entries are consecutively recorded by using a cache memory, so that a system file can be managed according to the present embodiment without increasing the recording time of the optical disc.

In this example, the optical disc has spirals such that the access directions of the adjacent recording layers are opposite from each other. Thus the recording area for File Bodies is formed from the point C to the inner periphery of the layer L1. In the case of an optical disc in uniform spiral directions, as has been discussed, the recording area for File Bodies is formed from the point C to the outer periphery.

The second embodiment described the triple-layer disc. The second embodiment is applicable to odd-numbered-layer discs including triple-layer, five-layer, seven-layer, and fifteen-layer discs.

Figure 1A:
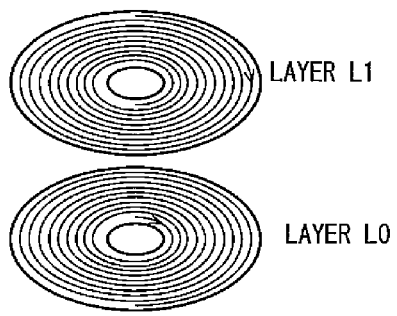
FIG. 1 shows the spiral directions of recording tracks on double-layer, triple-layer, and four-layer Blu-ray discs handled in the present invention.
Figure 1C:
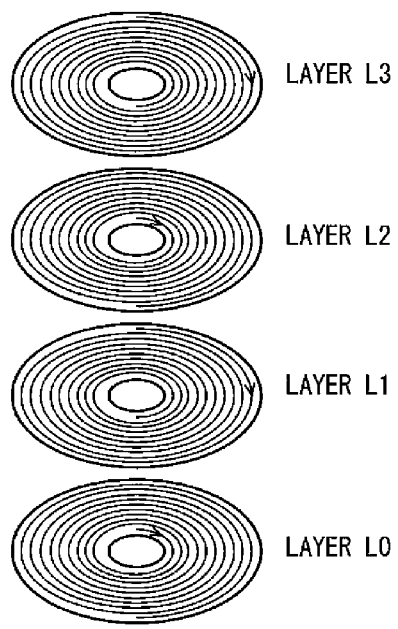
Figure 1B:
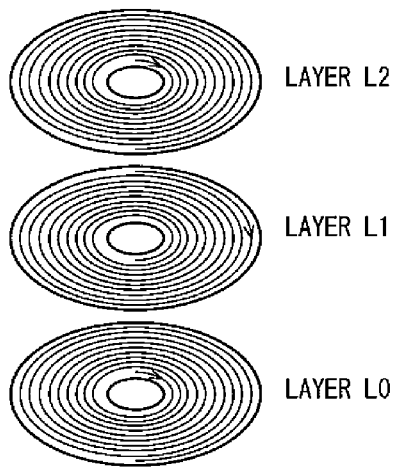

The following will describe the spiral directions of recording tracks on adjacent recording layers in discs, each having multiple recording layers. FIGS. 1(a), 1(b), and 1(c) show the spiral directions of the recording tracks in the discs having two, three, and four recording layers, respectively. As shown in FIG. 1, the adjacent recording layers have spiral structures in opposite directions. The odd-numbered layer from a substrate has a spiral from the inner periphery to the outer periphery and the even-numbered layer has a spiral from the outer periphery to the inner periphery. For example, in the four-layer disc, a layer L0 has a spiral from the inner periphery to the outer periphery, whereas a layer L1 has a spiral from the outer periphery to the inner periphery. A layer L2 has a spiral from the inner periphery to the outer periphery, whereas a layer L3 has a spiral from the outer periphery to the inner periphery.

As has been discussed, the spirals of the adjacent layers are opposite from each other in a Blu-ray disc. Thus in the case of discs having even-numbered layers such as four layers and eight layers, that is, in the case of a disc having layers as many as multiples of 4, the layer at a half of the capacity N has the same spiral direction as the layer L0 (a spiral direction from the inner periphery to the outer periphery) and the recording of File Entries and File Bodies is started from the inner periphery. Therefore, the moving distance of an optical pickup is shortened, thereby improving the access of an overall file.

In the case of six-layer and ten-layer discs other than discs having layers as many as multiples of 4, it is preferable that the recording of File Bodies is not started from the layer at a half of the capacity N and File Bodies are recorded in the adjacent layer (a layer L4 in a six-layer disc and a layer L6 in a ten-layer disc) on the surface of the disc. This is because the layer (the layer L4 in the six-layer disc and the layer L6 in the ten-layer disc) has the same spiral direction as the layer L0. Thus the recording of File Bodies is started from the innermost periphery of the layer and the File Bodies are recorded sequentially in the layers toward the surface of the disc. At the final layer closest to the surface, the layer at a half of the capacity N is used again, improving the access of the file.

In a five-layer disc and a nine-layer disc, layers L2 and L4 serving as intermediate layers have the same spiral direction (from the inner periphery to the outer periphery) as a layer L0. File Bodies are recorded from the innermost periphery to an intermediate radial position C of the layer and in recording layers stacked from the intermediate layer to the surface of the disc.

In the even-numbered-layer disc of the first embodiment and the odd-numbered-layer disc of the second embodiment, the recording of File Bodies is started from the intermediate layer at a half of the capacity N. When the recording area of the intermediate layer is full of File Bodies, the light beam is moved from the intermediate layer to the adjacent layer near the surface of the disc and then the recording of the subsequent File Body is started.

Thus the recording of File Bodies is started from the intermediate layer or the adjacent recording layer. In a sixteen-layer disc or a twenty-layer disc, File Entries are recorded in the farthest layer from the surface, and Bodies are recorded in the closest layer to the surface and are prevented from being physically located farthest from the surface, thereby preventing a deterioration of access.

In the first and second embodiments, the ratio between the recording area for File Entries and the recording area for File Bodies is one to one. The ratio of division can be optionally set. In this case, the boundary is not limited to the point C at N/2 and may be located at one end of any one of the recording layers or on any one of the recording layers without changing other configurations from those of the foregoing explanation. Further, the recording layers may be divided into the recording area for File Entries and the recording area for File Bodies at a predetermined ratio or may be divided by any dividing method, e.g., at an average ratio of data amount depending on the data type.

According to the file system managing method and a recording medium in which data is recorded by the method, the recording area of the recording medium is divided into the recording area for management data and the recording area for data bodies in a 1 to 1 ratio or at any ratio, the recording area for the management data is set in an area far from a surface that is adjacent to a pickup device, and the recording area for the data bodies is set in an area close to the surface, so that the management data requiring highly reliable access can be preferentially recorded in the area less affected by surface defects. It is therefore possible to reduce data access failures even when defects occur on the surface of the disc.

In this case, the surface defects are not limited to scratches or contamination during manufacture and surface defects may be caused by fingerprints during use. Further, the management data is rewritten not only in the writing of data but also in the selection of a folder. Thus even in the recorded management data, a recording state of information may be deteriorated by another defect during use. Also in this case, it is possible to suppress a deterioration of the recording state of the management data because the management data is preferentially recorded in an area far from the surface and is less affected by surface defects.

Third Embodiment

Referring to FIGS. 5 to 8, a file system managing method according to a third embodiment will be described below.

Figure 5:
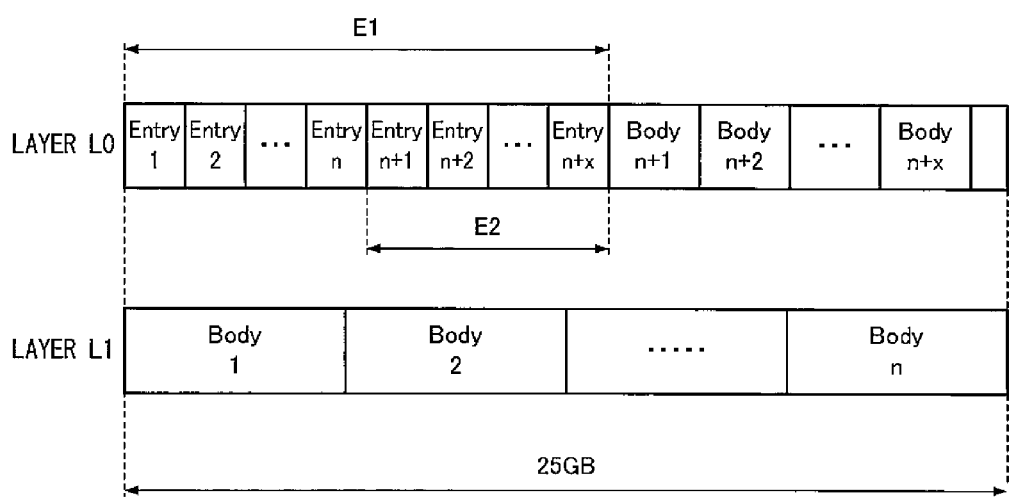
FIG. 5 is a data structural diagram showing a file system managing method according to a third embodiment.
Figure 6:
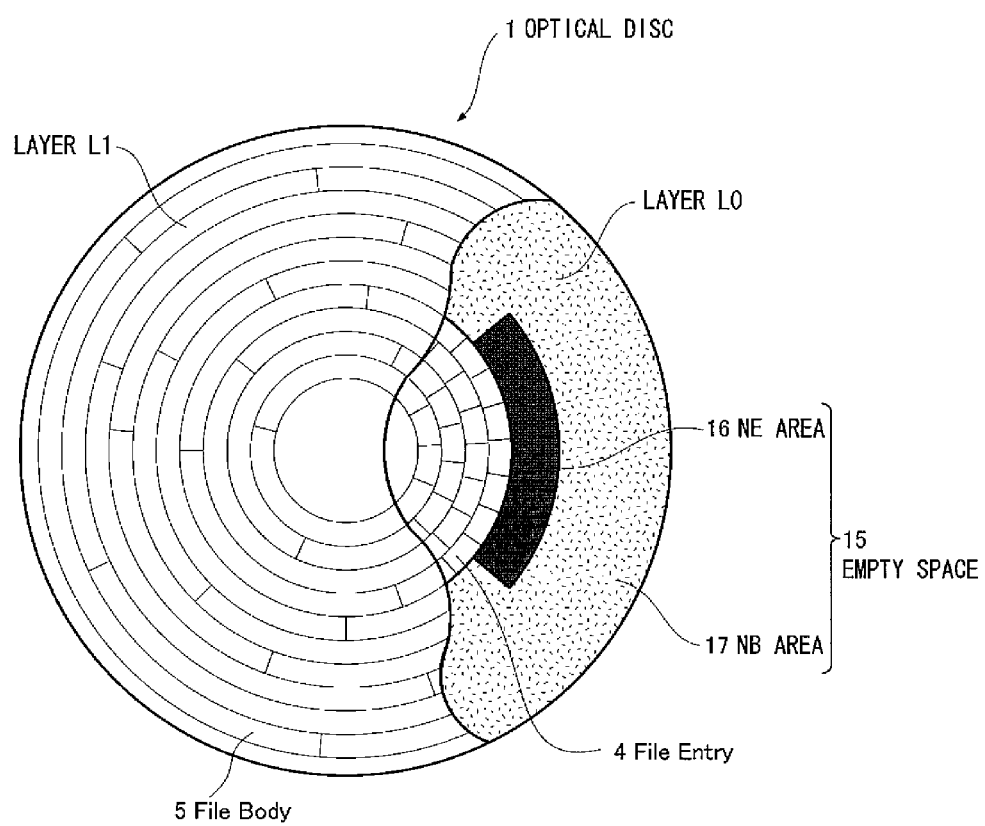
FIG. 6 is a plan schematic diagram showing a recording state of a disc according to the file system managing method of the third embodiment.

FIG. 5 is a data structural diagram showing the file system managing method of the third embodiment. FIG. 6 is a plan schematic diagram showing a recording state of a disc according to the file system managing method of the third embodiment. FIG. 7 shows a data structural diagram for explaining a method of dividing an empty space according to the third embodiment. FIG. 8 shows tables and distribution charts of data distributions according to the third embodiment.

According to the third embodiment, in the case where a recording area for File Bodies is not large enough in the first and second embodiments, a reserved area for File Entries is allocated to improve the recording efficiency of the overall disc. The third embodiment is particularly effective for a double-layer disc having a small capacity. The following will describe a double-layer disc as an example.

As shown in FIG. 5, File Entry 4 is typically management data and thus is substantially uniformly sized. File Body 5 varies in data size depending on the contents of data and is not smaller than File Entry 4. Thus in the case of the file system managing method in which recording layers are divided into a recording area for File Entries and a recording area for File Bodies in a 1 to 1 ratio, a writing area becomes insufficient in a layer L1 before a layer L0.

Even when the writing area of the layer L1 becomes full, a sufficient writing area is mostly left in the L0 layer. Thus in the third embodiment, after the writing area of the layer L1 becomes full, File Entry 4 is written as it is in the layer L0 and File Body 5 is written in an "empty space" following the area of File Entries in the layer L0. This writing method is used until the area of the layer L0 becomes full, so that also in the file system managing methods of the first and third embodiments, it is possible to reduce data access failures even if surface defects occur, and it is possible to record data while completely using the recording area of a Blu-ray disc having a double-layer structure.

Figure 7A:
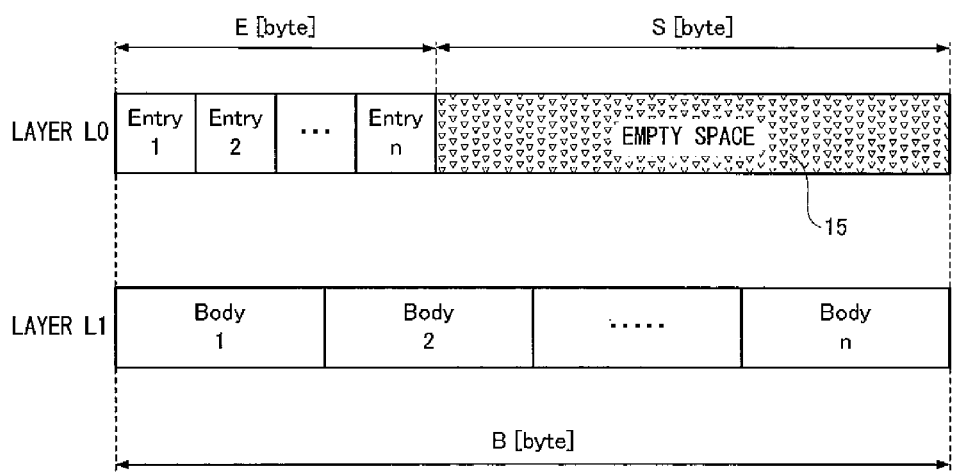
FIG. 7 shows a data structural diagram for explaining a method of dividing an empty space according to the third embodiment.
Figure 7B:
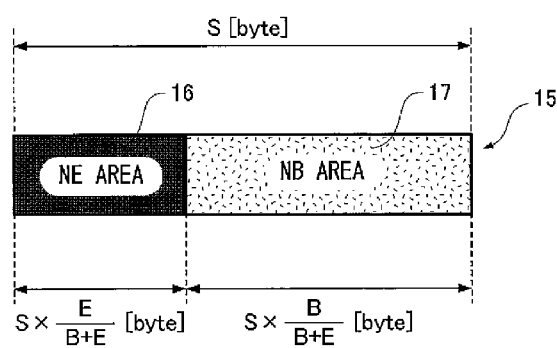

As shown in FIGS. 6 and 7, first in the writing of data, File Entry 4 of management data requiring highly reliable access is recorded only in the layer L0 that is less affected by surface defects. Then, the File Bodies as data bodies are recorded near the surface of the disc, that is, in the layer L1 that is considerably affected by surface defects. Missing data of the File Bodies is acceptable to some extent. During the writing of data, the layer L1 becomes full of File Bodies at some point in time. File Entries at this point have a smaller data amount than File Bodies. Thus as shown in FIG. 7(a), it is assumed that the layer L0 contains an empty space 15 of S [bytes].

In order to efficiently use the empty space 15, the empty space 15 is allocated to an NE area 16 for recording File Entries and an NB area 17 for recording File Bodies in an empty space managing method of the present invention. In the third embodiment, the empty space 15 is allocated to the NE area 16 and the NB area 17 at the ratio between the data amounts of recorded File Entries and File Bodies.

For example, in a state in which n pieces of data are recorded as shown in FIG. 7, it is assumed that the layer L1 is full of n File Bodies that add up to B [bytes] and the layer L0 contains n File Entries that add up to E [bytes] and the empty space 15 of S [bytes].

Since File Entries and File Bodies are recorded at a ratio of E to B, the empty space 15 is allocated to the NE area 16 and the NB area 17 at the ratio of E to B. Thus the NE area 16 is set as an area of S×E/(B+E) [bytes], following the recording area for File Entries and the other area of S×B/(B+E) [bytes] is set as the NB area 17.

The empty space 15 is divided thus at the ratio between the data amounts of recorded File Entries and File Bodies and is allocated to the NE area 16 for recording File Entries and the NB area 17 for recording File Bodies. Thus even if surface defects occur, it is possible to record data fully in the empty space 15 while suppressing data access failures, and prevent a reduction in data amount relative to a storage capacity.

FIG. 8 shows explanatory drawings of another method of dividing the empty space according to the third embodiment. FIG. 8(a) is a table showing the data size distribution of File Bodies. FIG. 8(b) is a graph showing the data size distribution of File Bodies. FIG. 8(c) is a table showing the data size distribution of File Entries. FIG. 8(d) is a graph showing the data size distribution of File Entries. FIG. 8(e) shows a state of the divided recording area of the empty space.

In the system file managing method of the present embodiment, when the empty space 15 is left as shown in FIG. 7(a), standard deviations are determined from the respective data amount distributions of File Entries and File Bodies. Data amounts with deviation values closest to 50 are respectively selected as a reference data amount LE of File Entries and a reference data amount LB of File Bodies, and the empty space 15 is divided at a ratio of LE to LB.

For example, as shown in FIG. 8, the distribution table of File Bodies is created (FIG. 8(a)) based on the number of pieces of data in any data range and the standard deviation is determined based on the distribution table. Further, a data range with a deviation value closest to 50 is selected and the center value of the data range is selected as the reference data amount LB of File Bodies. In the example of FIG. 8, a range of 512 k to 1 M [bytes] with a deviation value closest to 50 is selected and 768 k [bytes], which is the center value, is selected as LB (FIG. 8(b)). Similarly, the distribution table of File Entries is created (FIG. 8(c)) based on the number of pieces of data in any data range and the standard deviation is determined based on the distribution table. Further, a data range with a deviation value closest to 50 is selected and the center value of the data range is selected as the reference data amount LE of File Entries. In the example of FIG. 8, a range of 7 k to 11 k [bytes] with a deviation value closest to 50 is selected and 9 k [bytes], which is the center value, is selected as LE (FIG. 8(d)). After that, an NE area 18 is allocated continuously from the recording area for File Entries and the empty space 15 is divided into the NE area 18 and an NB area 19 at a ratio of LE to LB. In the example of FIG. 8, the empty space 15 is divided into the NE area 18 and the NB area 19 at a ratio of 9 to 768.

The empty space 15 is divided thus at the ratio between the standard deviations determined from the data amounts of recorded File Entries and File Bodies and is allocated to the NE area 18 for recording File Entries and the NB area 19 for recording File Bodies. Thus even if surface defects occur, it is possible to record data fully in the empty space 15 while suppressing data access failures, and prevent a reduction in data amount relative to the storage capacity.

When the File Entries are recorded with a constant data amount, the value of the data amount may be used as LE without determining a standard deviation.

In the case of a Blu-ray disc and other recording media in which three or more layers are stacked as a recording area, when a recording area for File Bodies becomes full, an empty space in at least one layer of a recording area for File Entries is allocated as an empty space 5 according to the foregoing method. Further, the dividing ratio is calculated using all the File Entries or File Bodies that are recorded in at least one recording area. The specific layout of NB and NE areas over at least three layers will be described in a fourth embodiment.

Referring to FIGS. 6 and 8(e), another method of managing an empty space will be described below. In this method, recorded in a table are the total data amount of written File Entries and a ratio of LE to LB between the NE area 18 and the NB area 19 that are required for writing the rest of the data. The total data amount of File Entries and the ratio of LE to LB have been determined by statistics. The empty space 15 is divided at the ratio of LE to LB between the NE area 18 and the NB area 19, the ratio being determined from the total data amount of written File Entries based on the table.

For example, first, the total data amount of written File Entries and a ratio of LE to LB between the NE area 18 and the NB area 19 that are required for writing the rest of the data are statistically determined. According to the statistical results, a table is created in which a ratio of LE to LB is recorded for each fixed width of the total data amount of File Entries.

When a writing area for File Bodies becomes full, the total data amount of File Entries is first determined. Next, referring to the table, a ratio of LE to LB is extracted so as to correspond to the total data amount of File Entries and then the empty space 15 is divided according to the ratio.

According to the file system managing method and a recording medium in which data is recorded by the method, the recording area of the recording medium is allocated into the NE area 18 for recording File Entries and the NB area 19 for recording File Bodies, by using a ratio determined from the total data amount of recorded File Entries based on the recorded table. Thus even if surface defects occur, it is possible to record data fully in the empty space 15 while suppressing data access failures, and prevent a reduction in data amount relative to the storage capacity.

Fourth Embodiment

Referring to FIG. 9, the following will describe a file system managing method according to a fourth embodiment. FIG. 9 illustrates the data structure of the file system managing method according to the fourth embodiment.

In the fourth embodiment, the empty space of File Entries is extracted according to the third embodiment and is allocated to an NE area for recording File Entries and an NB area for recording File Bodies. After that, the NB area can be optimally arranged in a multilayer disc having multiple layers such as three, four, and eight layers.

Figure 9A:
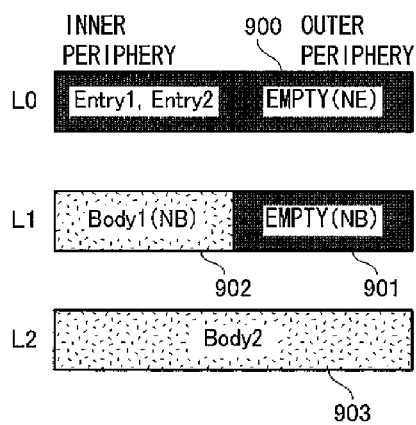
FIG. 9 illustrates the data structure of a file system managing method according to a fourth embodiment.
Figure 9B:
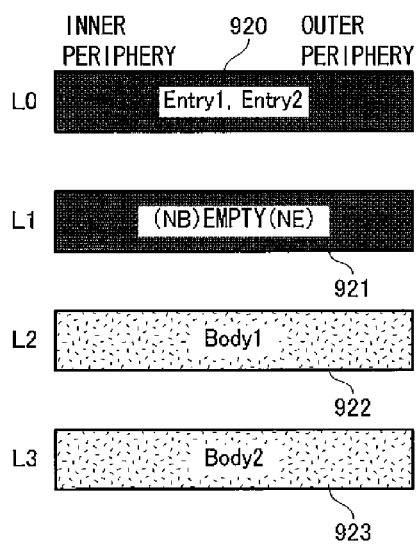
Figure 9C:
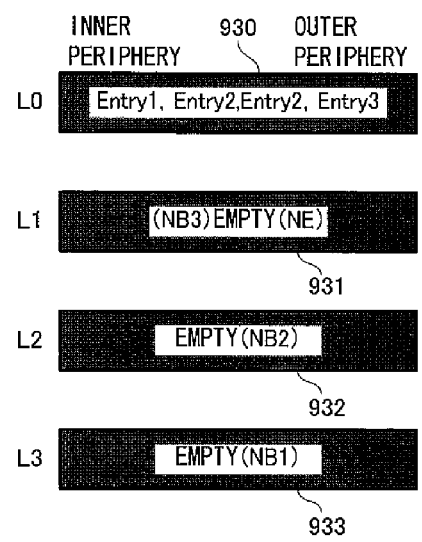
Figure 9C:
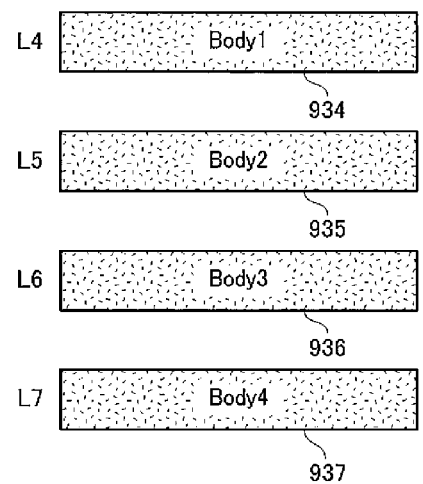

FIG. 9(a) shows a layout method of the NE area and the NB area in a triple-layer disc. FIG. 9(b) shows a layout method of the NE area and the NB area in a four-layer disc. FIG. 9(c) shows a layout method of the NE area and the NB area in an eight-layer disc. The following examples will describe a triple-layer disc, a four-layer disc, and an eight-layer disc.

In order to prevent File Entries from being lost by defects such as scratches on the surface of the disc, it is necessary to arrange the NE area as far as possible from the surface of the disc. Thus in the case of a triple-layer disc, as shown in FIG. 9(a), a recording area divided at a ratio of 1 to 1 has a point of division at the midpoint of a layer L1. In this management state, when File Body recording areas 902 and 903 of the layer L1 and a layer L2 are full of File Bodies B1 and File Bodies B2, there are an empty space 900 on the outer periphery of a layer L0 and an empty space 901 on the outer periphery of the layer L1 after File Entries E1 and File Entries E2 are recorded.

The ratio between the NE area for recording File Entries in the empty space and the NB area for recording File Bodies is calculated according to the method of the third embodiment. The NE area is preferentially allocated to the empty space 900 of the layer L0 and the NB area is preferentially allocated to the empty space 901 of the layer L1. When the empty space 900 of the layer L0 is not large enough, the NE area may be allocated to the empty space 901 of the layer L1 according to the ratio. In this case, it is preferable to allocate the NE area to the outer periphery of the empty space 901 and the NB area to the inner periphery of the empty space 901 in a spiral direction in consideration of the relationship between physical address consistency and a file system.

In the case of a four-layer disc, when File Body recording areas 922 and 923 of layers L2 and L3 are full of File Bodies B1 and B2 as shown in FIG. 9(b), there is an empty space 921 in a layer L1 after File Entries E1 and E2 are recorded.

First, according to the same method as the third embodiment, a ratio between an NE area for recording File Entries in an empty space and an NB area for recording File Bodies is calculated, and the storage capacities of the allocated NE and NB areas are determined according to the capacity of the layer L1 including the empty space.

Next, the NE area with the determined storage capacity is preferentially disposed from the outer periphery of the empty space of the layer L1 in the spiral direction of the layer L1 including the empty space. In the illustrated example, the NE area is allocated up to a point (midpoint) of the layer L1. Further, the empty space on the inner periphery of the layer L1 is allocated as the NB area.

When the number of Files is small and File Entries are small in size, another empty space may be allocated to a layer L0. In this case, the NE areas may be allocated sequentially to the layer L0 and the layer L1 according to the ratio, and then the NB area may be allocated to the layer L1.

In the case of an eight-layer disc, when File Body recording areas 934 to 937 of layers L4, L5, L6, and L7 are full of File Bodies B1, B2, B3, and B4 as shown in FIG. 9(c), there are empty spaces 931, 932, and 933 in layers L1, L2, and L3 after File Entries E1, E2, E3, and E4 are recorded.

First, according to the same method as the third embodiment, a ratio between an NE area for recording File Entries in the empty space and an NB area for recording File Bodies is calculated, and the storage capacities of the allocated NE and NB areas are determined according to the capacities of the layers L1, L2, and L3 including the empty spaces.

Next, the NE area with the determined storage capacity is preferentially disposed from the inner periphery of the empty space of the layer L1 in the spiral direction of the layer L1 including the empty space. In the illustrated example, the NE area is allocated up to a point of the layer L1. Further, the NB areas are allocated to the other empty spaces. The allocation of the NB areas, that is, the recording of File Bodies is started from the layer L3 closest to the original File Body recording area. When writing is continued in this state and the newly allocated NB areas are also full of File Bodies, an empty space in the NE area may be repeatedly divided.

The NB areas are sequentially allocated to the layers L3, L2, and L1 according to the ratio and the NE areas are allocated backward to the L1 and L2 layers, so that the NE areas for recording management data can be sequentially allocated from the layer L1 that includes the empty space and is the farthest from the surface of the disc.

The NE areas may be allocated in the respective recording layers such that the boundary between the NE area and the NB area is always located on one end of the recording layer. When the determined boundary is not located on one end of the recording layer, the recording layers are divided respectively into the NE area and the NB area after the boundary is shifted to one end of the recording layer in the spiral direction. Since the recording layers are divided thus, when the NB area is full of File Bodies again, the empty space of the NE area is not divided over the layers. Thus the NE area can be easily divided again into the NE and NB areas.

As has been discussed, in recording media such as a double-layer BD, a triple-layer BD, and a four-layer BD with stacked recording areas, the management data that is necessary for reading a file body and is susceptible to the influence of defects on a disc surface is preferentially located in the recording layer L0 far from the surface. Thus it is possible to prevent fingerprints or scratches on the surface from blocking incident light and reflected light and reduce signal degradation caused by reflection or the like, so that high data integrity can be provided, data can be fully recorded in the empty space 15, and a reduction in data amount can be suppressed relative to a storage capacity.

Moreover, in a Blu-ray disc, control data including a medium type, a book type, and a light strategy is located as PIC (Permanent Information & Control data zone) in the layer L0. At the activation of a drive, the drive always accesses from L0 and stands by in L0. Thus when a file folder is opened from an OS by the Explorer, only file entries including management data for displaying information are sequentially read, so that the collective recording of the management data increases the display speed and operability for users.

In the case of a multilayer disc having at least two layers, it is necessary to pass a light beam through a layer in front of a pickup and then record data in a rear layer. Thus it is necessary to obtain a certain transmittance in the front layer and make the transmittance constant before and after recording, so that in many cases, the design freedom considerably declines and the number of times of rewriting is sacrificed by the tradeoff.

In contrast, it is not necessary to adjust a transmittance in the deepest layer L0, and a reflective layer and a protective layer may be provided on an adjacent disc substrate, achieving stability design with ease. Thus the number of times of rewriting can be sufficiently obtained. For example, as a guide, the guaranteed number of times of rewriting may be limited to 10000 for the layer L0 and 1000 for the layer L1 depending on a medium manufacturer or a used phase change material.

The present invention is also applicable to the problem of a rewritable double-layer Blu-ray disc. For example, a user can issue a read command from an OS (Windows) only by opening a file folder with the Explorer and update File Entries. File Entries rewritten more often than File Bodies are preferentially located in the layer L0 while File Bodies are preferentially located in the layer L1, improving the reliability of the overall disc, particularly durability against repeated rewriting in a highly effective manner.

In the explanation, UDF was described as an example of a file system. The present invention is similarly applicable to other file systems that manage data divided into management data and a data body. The management data corresponds to the File Entry and the data body corresponds to the File Body in the explanation of the foregoing embodiments.

INDUSTRIAL APPLICABILITY

The present invention is useful for a file system managing method and a recording medium or the like using the same, in which data is recorded in the recording medium including stacked recording areas and a data file can be read even when defects such as fingerprints and scratches occur on the surface of the recording medium.

The invention claimed is:

1. A file system managing method, when file data composed of management data and data bodies is written in a recording medium comprising multiple recording layers stacked on a substrate, the recording medium having a recording area continuously formed from a most inner layer of the recording layers adjacent to the substrate to an outermost layer of the recording layers, the method comprising:
dividing the recording area into a management data recording area and a data bodies recording area at any boundary, the management data recording area including an end of the recording area in the most inner recording layer adjacent to the substrate, the data bodies recording area including an other end of the recording area in the outermost recording layer;

writing the management data in the management data recording area; and writing the data bodies in the data body recording area.

2. The file system managing method according to claim 1, wherein the data body recording area has a storage capacity equal to a storage capacity of the management data recording area.

3. The file system managing method according to claim 2, wherein the recording layers are even-numbered and a boundary between the data body recording area and the management data recording area is situated on an end of the recording layer.

4. The file system managing method according to claim 2, wherein the recording layers are odd-numbered and a boundary between the data body recording area and the management data recording area is situated on a midpoint of the recording layer.

5. The file system managing method according to claim 4, wherein in consideration of a spiral direction of the recording layer, the management data recording area is allocated upstream in the spiral direction.

6. The file system managing method according to claim 2, wherein in consideration of a spiral direction of the recording layer, the data body recording area has a recording starting point upstream in the spiral direction.

7. The file system managing method according to claim 2, when the data body recording area has an insufficient writing area and the management data recording area has an empty space, the method further comprising:
dividing the empty space into a free-space data body recording area and a free-space management data recording area allocated to an area continuing from the management data recording area, at a ratio between a data amount of the written management data and a data amount of the written data bodies.

8. The file system managing method according to claim 7, wherein a boundary between the free-space data body recording area and the management data recording area is situated on an end of the recording layer such that the end of the recording layer is adjacent, in a writing direction, to a boundary determined according to the ratio between the data amounts.

9. The file system managing method according to claim 2, when the data body recording area has an insufficient writing area and the management data recording area has an empty space, the method further comprising:
determining a standard deviation of data amounts of the written data bodies;
selecting one of the data amounts of the data bodies as a reference data amount of the data bodies, the selected data amount being closest to a deviation value of 50;
determining a standard deviation of data amounts of the written management data;
selecting one of the data amounts of the management data as a reference data amount of the management data, the selected data amount being closest to a deviation value of 50; and
dividing the empty space into a free-space data body recording area and a free-space management data recording area allocated to an area continuing from the management data recording area, at a ratio between the reference data amount of the data bodies and the reference data amount of the management data.

10. The file system managing method according to claim 2, wherein the file data is managed by a UDF file system, the management data is a File Entry, and the data body is a File Body.

11. The file system managing method according to claim 2, wherein the recording medium is an optical disc.

12. The file system managing method according to claim 1, when the data body recording area has an insufficient writing area and the management data recording area has an empty space, the method further comprising:
dividing the empty space into a free-space data body recording area and a free-space management data recording area allocated to an area continuing from the management data recording area, at a ratio between a data amount of the written management data and a data amount of the written data bodies.

13. The file system managing method according to claim 1, when the data body recording area has an insufficient writing area and the management data recording area has an empty space, the method further comprising:
determining a standard deviation of data amounts of the written data bodies;
selecting one of the data amounts of the data bodies as a reference data amount of the data bodies, the selected data amount being closest to a deviation value of 50;
determining a standard deviation of data amounts of the written management data;
selecting one of the data amounts of the management data as a reference data amount of the management data, the selected data amount being closest to a deviation value of 50; and
dividing the empty space into a free-space data body recording area and a free-space management data recording area allocated to an area continuing from the management data recording area, at a ratio between the reference data amount of the data bodies and the reference data amount of the management data.

14. A recording medium in which file data composed of management data and data bodies is recorded and a recording area is formed of multiple recording layers stacked on a substrate, the recording area being continuously formed from a most inner layer of the recording layers adjacent to the substrate to an outermost layer of the recording layers, wherein the recording area is divided into a management data recording area and a data bodies recording area at any boundary, the management data recording area including an end of the recording area in the inner most recording layer adjacent to the substrate, the data bodies recording area including an other end of the recording area in the outermost recording layer, the management data is recorded in the management data recording area, and the data bodies are recorded in the data body recording area.

15. The recording medium according to claim 14, wherein the data body recording area has a storage capacity equal to a storage capacity of the management data recording area.

16. The recording medium according to claim 15, wherein the data bodies are recorded in the overall data body recording area and an empty space other than the recorded management data in the management data recording area is further divided into a free-space data body recording area and a free-space management data recording area.

17. The recording medium according to claim 14, wherein the data bodies are recorded in the overall data body recording area and an empty space other than the recorded management data in the management data recording area is further divided into a free-space data body recording area and a free-space management data recording area.

* * * * *